Patented Jan. 8, 1946

2,392,361

UNITED STATES PATENT OFFICE 2,392,361

ESTERS OF HYDROXY BENZOIC ACIDS

Edgar C. Britton and Ezra Monroe, Midland, Mich., assignors to The Dow Chemical Company, Midland, Mich., a corporation of Michigan No Drawing. Application April 10, 1942, Serial No. 438,437

6 Claims. (Cl. 260—474)

The present invention relates to certain new esters, and particularly to hydroxy-benzoates of hydroxy-phenones of the formula:

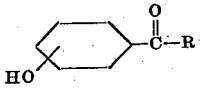

wherein R is an aryl, alkyl, or hydroxy-aryl radical.

Preferred embodiments of the invention reside in the mono-esters having the general formula:

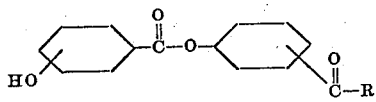

wherein R is an alkyl, aryl, or hydroxy-aryl radical, and in the di-esters having the general formula:

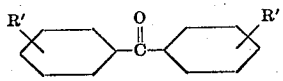

wherein each R' represents an hydroxy-benzoxy radical.

Certain of the above compounds have been prepared, and the physical properties thereof determined whereby they may be readily identified. The new compounds herein described have valuable medicinal properties as local anesthetics and for other uses. These compounds are particularly useful as intermediates in the manufacture of pharmaceuticals and as plasticizing agents for cellulose derivatives such as ethyl cellulose. The invention, then, lies in the new products hereinafter fully described and particularly pointed out in the claims.

The new compounds can be prepared by heating a phenyl ester of a hydroxy-benzoic acid, e. g., salol, with a hydroxy-phenone such as 4-hydroxybenzophenone under reduced pressure. The reaction is preferably carried out by heating equivalent reacting quantities of the phenyl ester and the desired hydroxy-phenone to a temperature between about 140° C. and 220° C. while maintaining the pressure in the reaction vessel below about 30 millimeters of mercury. Phenol, formed as a by-product during the reaction, is removed from the reaction zone by distillation and collected in a receiver. This provides a ready means of determining when the reaction is substantially complete and prolonged heating of the product can be avoided. The crude product may be purified either by fractional distillation under reduced pressure or by crystallization from a suitable solvent.

An alternate method of preparing the new compounds is by esterifying a hydroxy-benzoic acid with a hydroxy-phenone in the presence of a condensing agent such as phosphorous oxychloride.

The following examples described in detail the preparation of certain of our new compounds, but are not to be construed as limiting the invention.

Example 1

107 grams (0.5 mol) of salol and 54 grams (0.252 mol) of 4,4'-dihydroxy-benzophenone were placed in a Claisen flask and the flask placed in an oil bath. The pressure in the reaction flask was reduced to 25 millimeters of mercury and the oil bath gradually heated. When the reacting materials reached a temperature of 167° C., phenol started to distill from the reaction mixture. The heating was continued until the temperature of the reacting mixture was 220° C., at which time 43 grams of phenol had been removed. The reaction was substantially completed in one and one-half hours. The resulting crude 4,4'-benzophenone disalicylate product was purified by crystallization from glacial acetic acid to obtain 35 grams of a white crystalline solid having a melting point of 186°–188° C., and the formula:

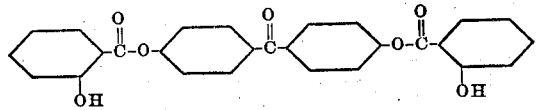

Example 2

In a similar manner 4-hydroxy-benzophenone was reacted with salol to obtain 4-benzophenone salicylate as a white crystalline solid melting at 104°–106° C. and having the formula:

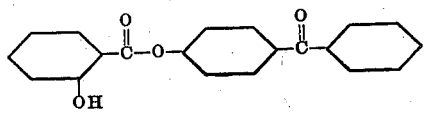

Example 3

4-hydroxy-propiophenone was reacted with salol substantially as described in Example 1 to obtain 4-propiophenone salicylate as a white crystalline solid melting at 104°–108° C. and having the formula:

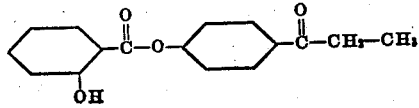

Example 4

107 grams (0.5 mol) of 2,2'-dihydroxy-benzophenone and 214 grams (1.0 mol) of salol were placed in a flask and heated to a temperature of 170°–244° C. in an oil bath while maintaining the pressure in the reaction flask between about 20 and about 45 millimeters of mercury. The reaction was substantially complete after heating the mixture for 3 hours. The crude product was dissolved in 200 milliliters of toluene, washed successively with dilute aqueous sodium hydroxide solution and water, dried, and the toluene removed by distillation. The residue was a pale yellow soft tacky mass, consisting of a mixture of 2-hydroxy-benzophenone 2'-salicylate and 2,2'-benzophenone disalicylate. This product may be employed as a plasticizing agent for ethyl cellulose compositions.

Example 5

2,4'-dihydroxy-benzophenone was reacted with salol in a manner similar to that described in Example 4. A mixture of 2,4'-benzophenone disalicylate and mono-hydroxy-benzophenone mono-salicylate was thereby obtained as a viscous yellow liquid soluble in toluene, ethyl acetate, ethylene chloride, and ethyl alcohol. Upon standing for several days the product partly crystallized. The crystals were separated, washed with a small amount of methanol, and dried to obtain 2,4'-benzophenone disalicylate as a light tan crystalline solid melting at 175°–179° C. and having the formula:

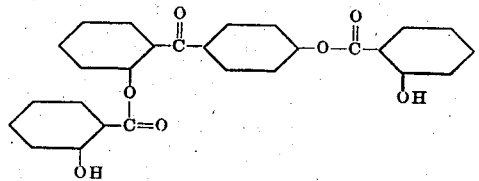

Example 6

4-hydroxy-acetophenone, melting at 106°–110° C., was reacted with salol to obtain 4-acetophenone salicylate as a white crystalline solid melting at 140°–142° C. and having the formula:

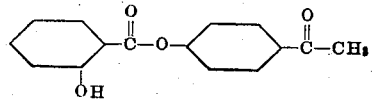

Among the hydroxy-benzoates which may be prepared substantially as described above are 4-benzophenone 4-hydroxy-benzoate, 4,4'-benzophenone di-(4-hydroxy-benzoate), 4-propiophenone 4-hydroxy-benzoate, 2,4'-benzophenone di-(4-hydroxy-benzoate), 2,2'-benzophenone disalicylate, 4-hydroxy-benzophenone 4'-salicylate, 2-hydroxy-benzophenone 2'-(4-hydroxy-benzoate), 2-hydroxy-benzophenone 4'-salicylate and 4-acetophenone 4-hydroxy-benzoate.

When di-hydroxy-benzophenones are esterified with a hydroxy-benzoic acid, according to the herein described procedures, mixtures of the mono- and di-esters are obtained. These mixed products may be used as plasticizing agents for resins without further purification.

We particularly point out and distinctly claim as our invention:

1. A hydroxy-benzoate of a hydroxy-phenone of the formula:

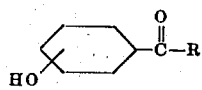

wherein R is selected from the group consisting of the alkyl, aryl, and hydroxy-aryl radicals.

2. An ester having the general formula:

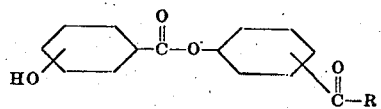

wherein R is selected from the group consisting of the alkyl, aryl, and hydroxy-aryl radicals.

3. An ester having the general formula:

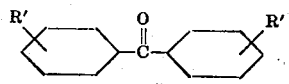

wherein each R' represents hydroxy-benzoxy radical.

4. 4-benzophenone salicylate, a white crystalline solid having a melting point of 104°–106° C. and the formula:

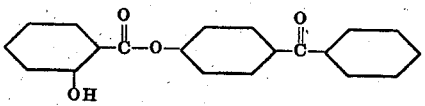

5. 4,4'-benzophenone disalicylate, a white crystalline solid having a melting point of 186°–188° C. and the formula:

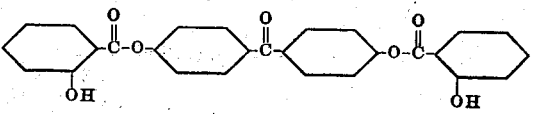

6. 4-acetophenone salicylate, a white crystalline solid having a melting point of 140°–142° C. and the formula:

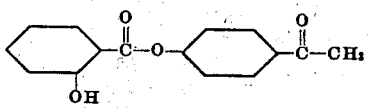

EDGAR C. BRITTON.
EZRA MONROE.